UNITED STATES PATENT OFFICE.

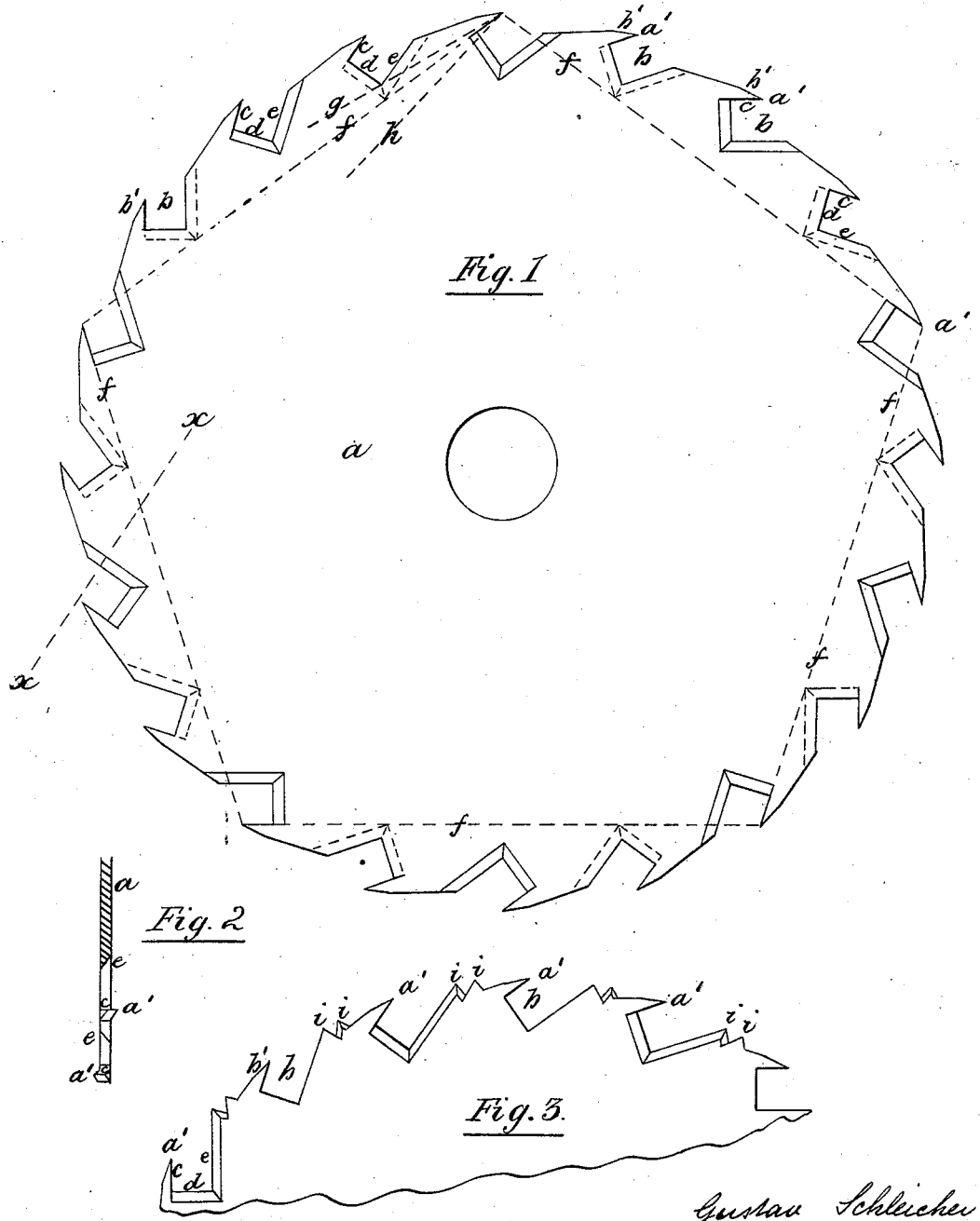

GUSTAV SCHLEICHER, OF MOUNT VERNON, NEW YORK.

IMPROVEMENT IN CIRCULAR SAWS.

Specification forming part of Letters Patent No. 212,516, dated February 18, 1879; application filed January 2, 1879.

*To all whom it may concern:*

Be it known that I, GUSTAV SCHLEICHER, of Mount Vernon, county of Westchester, State of New York, have invented certain new and useful Improvements in Circular Saws, of which the following is a specification:

This invention relates to circular saws; and consists in a novel formation of the teeth, whereby the efficiency of the saw is greatly increased, and the power required to run it reduced to a minimum. This I accomplish by cutting the clearance-notches rectangular in form, in such a direction as to leave the clearing-faces of the teeth straight, and at a considerable angle to the radial line, and the direction given to the clearing-faces of the teeth I find most advantageous in practice is that in which these faces form parts of regular inscribed pentagons.

I provide the main teeth with two small angular teeth, filed to sharp points and edges alternately from either side of the saw, and they act as scorers, to assist the succeeding tooth to more readily remove its shaving.

But to describe my invention more particularly, I will refer to the accompanying drawings, forming part of this specification, in which—

Figure 1 represents a saw made according to my invention, for ripping purposes. Fig. 2 is a section of the same cut through the line $x\ x$; and Fig. 3 represents part of a saw for cross-cutting.

The body of the saw $a$ is made in the ordinary manner, either of an equal thickness throughout or tapering thinner toward the center. The teeth $a'\ a'$ are formed on the periphery by cutting out the rectangular recesses $b\ b$, and filing or grinding the outside parts, $b'\ b'$, flat, to bring the point of the teeth to a chisel form. The sides $c\ c$ of the recess form the clearing-faces of the teeth, and are left the full width of the thickness of the saw, while the bottom sides, $d\ d$, and the sides $e\ e$ are beveled off to sharp edges on the same side of the saw at which their teeth are set over.

It will be observed that the side of the rectangular recess which forms the clearing-face of the tooth is a part of a regular inscribed pentagon, as shown by the dotted lines $f\ f$, and this I have found to be the angle to which this face should be made to give the best results, although a slight deviation from it to either one side or the other does not very materially affect the working of the saw, as shown by the dotted lines $g\ h$.

The number of teeth made in the saw will be governed by the size of and work on which the saw is to be used, and in only such number of teeth as are divisible by five without a remainder will a tooth appear on each corner of any regular inscribed pentagon, as shown in the drawings, Fig. 1, it, of course, being readily understood my particular form of tooth can be maintained, whatever the number of teeth may be.

I provide two small triangular teeth, $i\ i$, Fig. 3, just behind each of the main teeth $a'\ a'$, the teeth $a'\ a'$ and recesses $b\ b$ being made as just before described. The points and sides of these triangular teeth $i\ i$ are filed to a sharp edge alternately from either side of the saw, so that they merely score the wood in advance of the succeeding tooth, enabling the chisel-edge of the tooth to more readily remove the chips.

Having now described my invention, what I claim, and desire to secure by Letters Patent, is—

1. A circular saw the cutting-teeth of which are formed by cutting out the rectangular recesses $b\ b$ at such an angle around the periphery that the clearing-faces $c\ c$ of the teeth are parts of regular inscribed pentagons, substantially as hereinbefore set forth.

2. In a circular saw, the combination of the tooth $a'$, formed by cutting out the rectangular recess $b$, with the two triangular scoring-teeth $i\ i$, substantially as and for the purpose hereinbefore set forth.

In witness whereof I have hereunto set my hand this 28th day of December, 1878.

GUSTAV SCHLEICHER.

Witnesses:
 FRED. KRUSE,
 ALFRED SHEDLOCK.